(12) United States Patent
Farnsworth et al.

(10) Patent No.: US 8,751,093 B2
(45) Date of Patent: Jun. 10, 2014

(54) HIERARCHICAL ACCUMULATED VALIDATION SYSTEM AND METHOD

(75) Inventors: Jared M. Farnsworth, Roseville, CA (US); Koichi Ueda, Torrance, CA (US); Hakan Yazarel, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 124 days.

(21) Appl. No.: 13/448,304

(22) Filed: Apr. 16, 2012

(65) Prior Publication Data
US 2013/0274949 A1    Oct. 17, 2013

(51) Int. Cl.
*G06F 7/00*    (2006.01)

(52) U.S. Cl.
USPC ........................................... 701/29.1

(58) Field of Classification Search
USPC ........................... 701/29.1, 29.3, 1
See application file for complete search history.

(56) References Cited

U.S. PATENT DOCUMENTS

| | | | |
|---|---|---|---|
| 6,553,297 B2 | 4/2003 | Tashiro et al. | |
| 6,654,910 B1 | 11/2003 | Eibach et al. | |
| 6,981,176 B2 | 12/2005 | Fruehling et al. | |
| 7,286,921 B2 | 10/2007 | Kobayashi | |
| 7,669,185 B2 | 2/2010 | Vrancic et al. | |
| 8,060,285 B2 | 11/2011 | Chigusa | |
| 2010/0017191 A1* | 1/2010 | Yamanaka et al. | 703/25 |
| 2010/0030546 A1 | 2/2010 | Dong et al. | |
| 2010/0031212 A1* | 2/2010 | Dong et al. | 716/8 |
| 2010/0077383 A1* | 3/2010 | Watanabe | 717/124 |
| 2010/0287563 A1* | 11/2010 | Kishita | 719/313 |
| 2011/0098886 A1 | 4/2011 | Deng | |
| 2011/0137631 A1* | 6/2011 | Komatsu et al. | 703/6 |

OTHER PUBLICATIONS

Li et al.; "Design and Control of the Propulsion for a Series Hybrid Electric Vehicle"; IEEE Proceeds of the 8th World Congress on Intelligent Control and Automation; pp. 2159-2162; Jul. 6-9, 2010.
Arsie et al.; "A Computer Code for SI Engine Control and Powertrain Simulation"; SAE Technical Paper Series; 17 pages; Mar. 6-9, 2000.
Cuatto et al.; "A Case Study in Embedded Systems Design: An Engine Control Unit"; Design Automation for Embedded Systems, vol. 6; pp. 71-88; 2000.
Kiencke, Uwe; "A View of Automotive Control Systems"; IEEE Control Systems Magazine; pp. 11-19 Aug. 1988.
Moser et al.; "Development Support for the Design of Distributed Control Systems in a Road Vehicle"; Seoul 2000 FISITA World Automotive Congress; pp. 1-6. Jun. 12-15, 2000.

* cited by examiner

*Primary Examiner* — Hussein A. Elchanti
(74) *Attorney, Agent, or Firm* — Snell & Wilmer LLP

(57) ABSTRACT

The present disclosure generally relates to improvements in validating control specifications and more particularly pertains to a system and method to hierarchically validate graphically based executable logic control specifications. This method may include identifying, by a processor for hierarchically validating a graphically based logic control specification, a functional hierarchy of a first application of the control specification comprising a first feature. The method may include executing, by the processor, a specific first feature test case on the first feature to at least one of validate a structure of the first feature and validate that a specific functional requirement of the first feature is met.

20 Claims, 12 Drawing Sheets

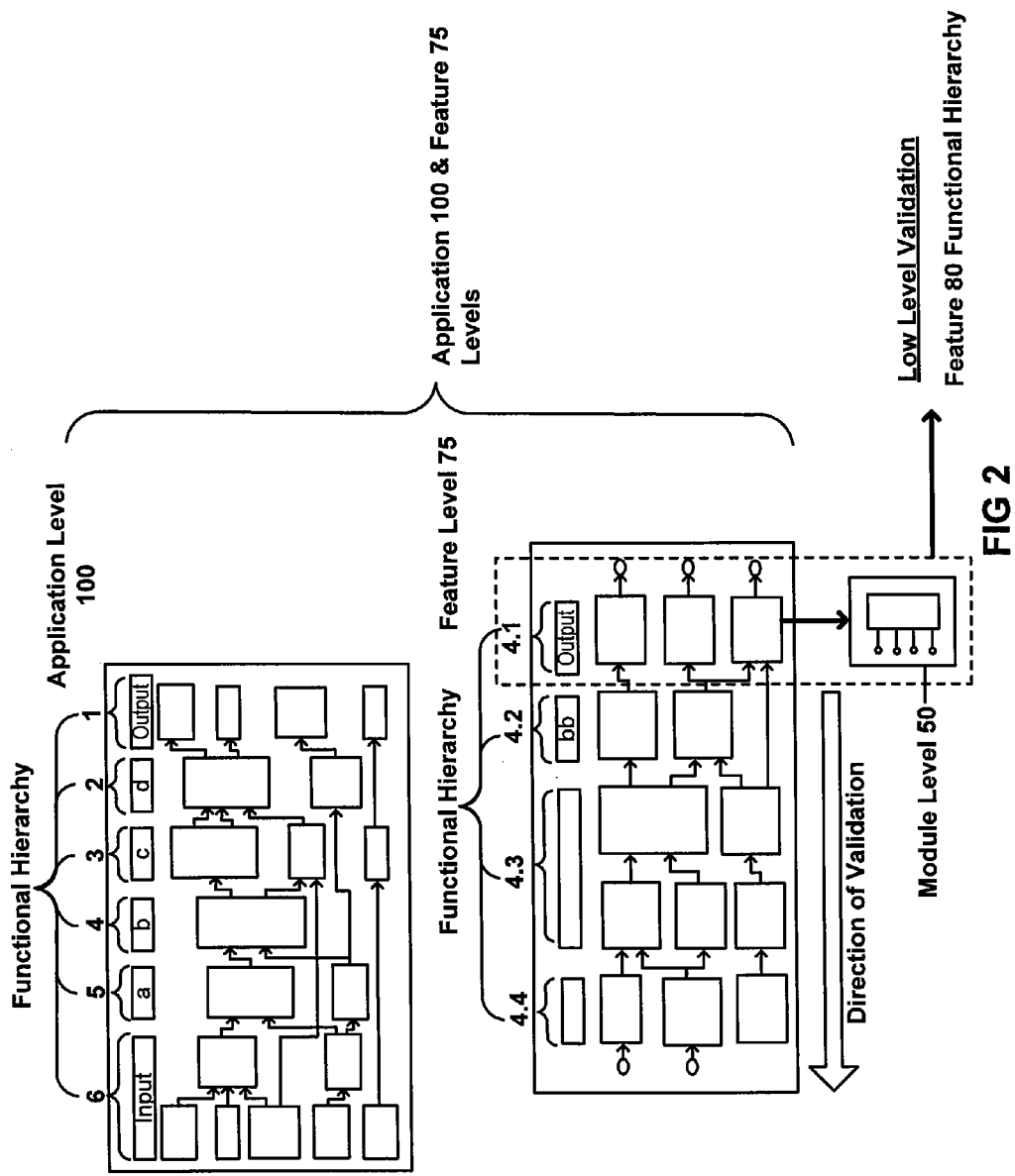

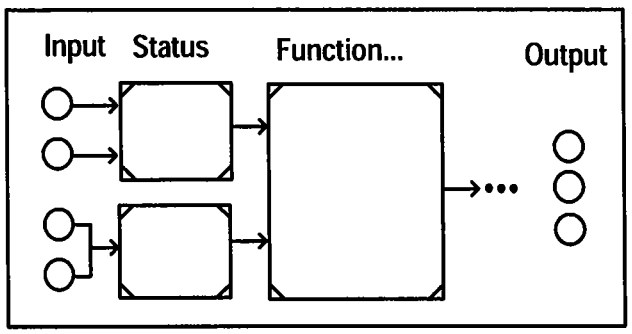
Application.mdl
Application Level 100
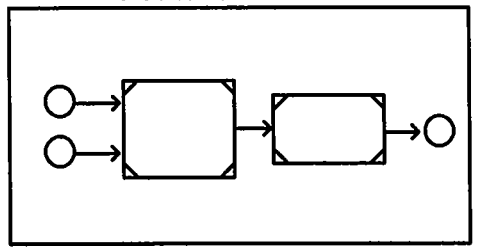
Feature.mdl
Feature Level 75
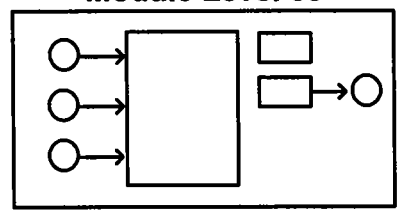
Module.mdl
Module Level 50
FIG 8

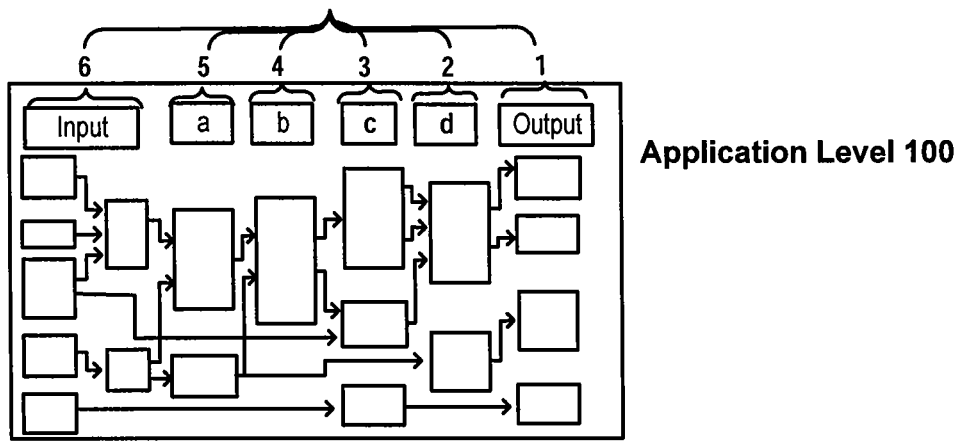
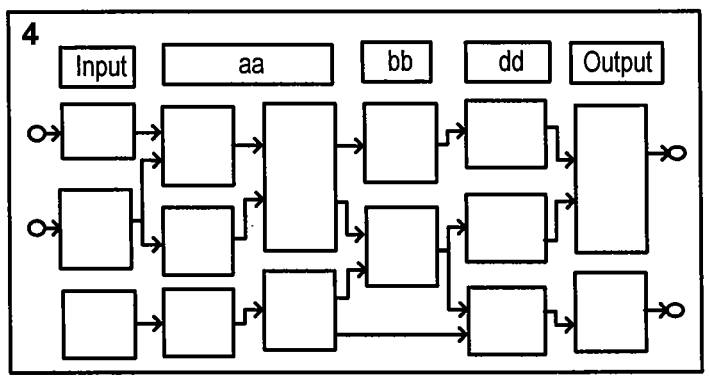
FIG 9

HIERARCHICAL ACCUMULATED VALIDATION SYSTEM AND METHOD

BACKGROUND

1. Field

The present disclosure relates generally to improvements in validating control specifications and more particularly pertains to a system and method to hierarchically validate graphically based executable logic control specifications.

2. Description of the Related Art

As demand grows for new in-vehicle features, a large number of electronic control modules are being introduced in the automobile to increase passenger's comfort, safety, entertainment and overall performance. The performance parameters of features such as electronic power steering, engine management systems, anti-lock braking systems, airbag systems, transmission systems, and navigation and entertainment systems are monitored and controlled by electronic control units (ECUs). Vehicle level ECU design and testing for small hardware or software changes is expensive and computationally intensive. Historically, module level tests have proved insufficient and are unable to be used to validate an entire ECU. Thus, a more efficient and inclusive system and method of validating designs to comply with a standard is desired.

SUMMARY

The above disclosed needs are successfully met via the disclosed system and method. The present disclosure is generally directed to a system and method to hierarchically validate a graphically based executable logic control specification designed to comply with a standard, such as an ISO standard.

In various exemplary embodiments, a computer-based method, a system, and an article of manufacture including a non-transitory, tangible computer readable storage medium having instructions stored thereon is disclosed. This computer-based method may include identifying, by a processor for hierarchically validating a graphically based logic control specification, a functional hierarchy of a first application of the control specification comprising a first feature. The computer-based method may include executing, by the processor, a specific first feature test case on the first feature to at least one of validate a structure of the first feature or validate that a specific functional requirement of the first feature is met. Also, this computer-based method may include executing, by the processor, a specific first application test case on the first application to validate a functional requirement of the first application is met.

This computer-based method may also include executing, by the processor, a specific second feature test case to a second feature to at least one of validate a structure of the second feature or validate that a specific functional requirement of the second feature is met. The functional hierarchy may comprise the second feature. Additionally, the validation of the second feature may include the validation of the first feature. The first feature generally includes one or more modules. The computer-based method may include translating text based code into graphically based logic and/or translating graphically based logic into text based code. This computer-based method may include validating all of the applications in the control specification and/or validating an entire electronic control unit, such as an ECU of a vehicle. The vehicle may be any type of vehicle.

Additionally, this computer-based method may include identifying, by the processor, a functional hierarchy of the first feature of the first application. The validation process may start at the end of the control specification and validate to the beginning. A unique feature test case may be developed to validate each feature's unique functional requirement. In various exemplary embodiments, the hierarchical validation process flows from module level, to feature level, to application level. Based on computational constraints, functional hierarchies may be subdivided. Substantially exhaustive validation coverage may be achieved by overlapping test case findings. In an embodiment, each feature may be a function within the application and/or the graphically based logic control specification.

This computer-based method may be used to validate a system to an International Organization for Standardization (ISO) specification. The graphically based logic control specification data may be rendered on a user interface. The computer-based method may include executing, by the processor, a specific first application test case on the first application to validate that a specific functional requirement of the first application is met.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the features of the present disclosure. In the drawings, like reference numerals designate like parts throughout the different views, wherein:

FIG. 2 depicts an exemplary high level graphically based executable logic control specification functional hierarchy;

FIG. 8 depicts exemplary .mdl data structure representations; and

FIG. 9 depicts an exemplary high level graphically based executable logic control specification functional hierarchy.

DETAILED DESCRIPTION

Figure 1A:
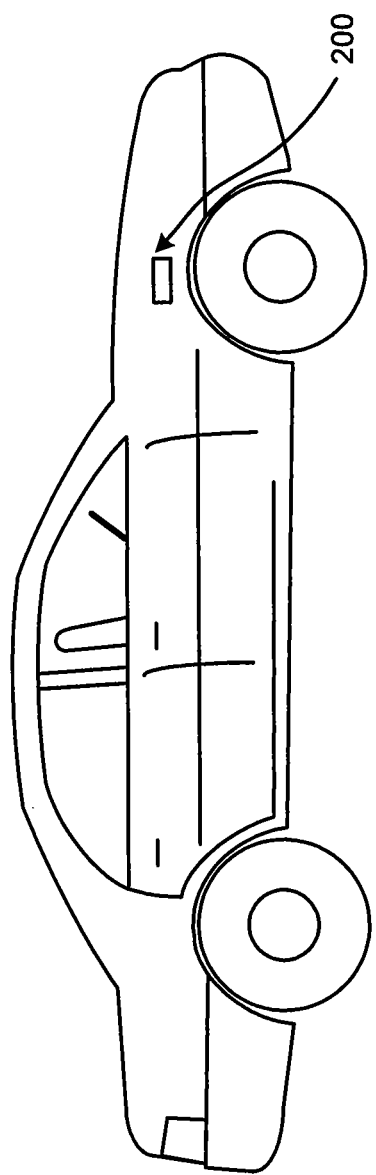
FIGS. 1A and 1B depict an exemplary embodiment of a validated ECU in use in a vehicle.

In the Automobile industry, an electronic control unit (ECU) is an embedded electronic device, such as a digital computer, that read signals coming from sensors placed at various parts/locations and in different components of the car (See FIG. 1A). Depending on this signal data, the ECU controls various units (e.g. engine) and automated operations within the car and also keeps a check on the performance of some key components used in the car.

An ECU generally comprises hardware and software (firmware). The hardware may comprise various electronic components on a printed circuit board (PCB). These components may further comprise a microcontroller chip along with an EPROM or a flash memory chip. The software (firmware) may be a set of lower-level codes that are processed by the microcontroller.

Figure 1B:
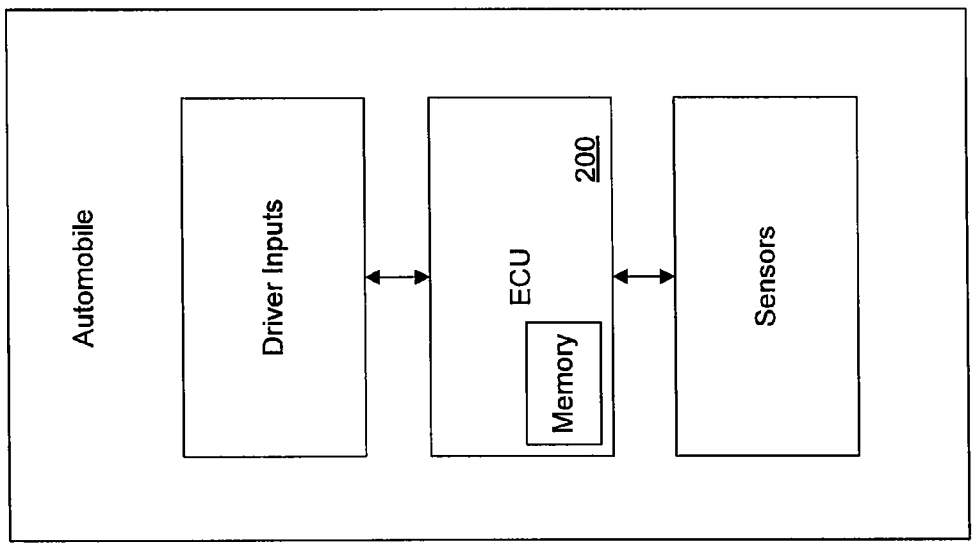

Many times, in the industry, an ECU (Engine Control Unit) may be referred to as an ECM (Engine Control Module). The ECM, also known as EMS (Engine management system), is an ECU in an internal combustion engine that controls various engine functions such as fuel injection, ignition timing and idle speed control system. This control may be based on data (like engine coolant temperature, air flow, crank position, etc.) received from various sensors (See FIG. 1B). The ECM may also "learn about" the engine as the car is driven. The "learning" is actually a process that the ECU uses to track the tolerance changes of the sensors and/or actuators on the engine. The ECM stores these "learned" values in battery backed-up RAM so that it doesn't have to start from scratch the next time the engine is turned over. In the aeronautical applications these systems (ECM equivalents) are popularly called as 'FADECs' (Full Authority Digital Engine Control). Referring to FIGS. 1A and 1B, an exemplary vehicle is shown including an ECU 200. As depicted in FIG. 1B, the ECU 200 may be configured to receive input from sensors and to receive input directly from a user, e.g. driver of the vehicle.

The creation of a complete ECU 200 is an intensive process that requires rigorous, planning, testing, and verification. Often times, the design of the ECU 200 or parts of the ECU 200 may be aided through use visual programming language (VPL), Model Based Development (MBD) and/or graphically based executable logic. In computing, a visual programming language is any programming language that lets users create programs by manipulating program elements graphically rather than by specifying them textually. VPL allows programming with visual expressions, spatial arrangements of text and graphic symbols, used either as elements of syntax or secondary notation. For example, many VPLs (known as dataflow or diagrammatic programming) are based on the idea of "boxes and arrows", where boxes or other screen objects are treated as entities, connected by arrows, lines or arcs which represent relations.

VPLs may be further classified, according to the type and extent of visual expression used, into icon-based languages, form-based languages, and diagram languages. Visual programming environments provide graphical or iconic elements which can be manipulated by users in an interactive way according to some specific spatial grammar for program construction.

The VPL based design and operation of the ECU 200 may be intended to conform to a specification. Verification and validation may be independent procedures that are used together for checking that a product, service, or system, such as the complete ECU 200 or that portions of the ECU 200, meet requirements and specifications and fulfill its intended purpose. In some cases, these are components of a quality management system, such as ISO 9000. In various embodiments, verification and/or validation may be performed by a third party. Verification may check that a product, service, or system (or portion thereof, or set thereof) meet a set of initial design requirements, specifications, and regulations. In the development phase, verification procedures involve performing special tests to model or simulate a portion, or the entirety, of a product, service or system, then performing a review or analysis of the modeling results. In the post-development phase, verification procedures involve regularly repeating tests devised specifically to ensure that the product, service, or system continues to meet the initial design requirements, specifications, and regulations as time progresses. It is a process that is used to evaluate whether a product, service, or system complies with regulations, specifications, or conditions imposed at the start of a development phase. Verification can be in development, scale-up, or production. This is often an internal process.

Validation may be used to check that development and verification procedures for a product, service, or system (or portion thereof, or set thereof), such as the complete ECU 200 or that portions of the ECU 200, result in a product, service, or system (or portion thereof, or set thereof) that meets initial requirements, specifications; and regulations. For a new development flow or verification flow, validation procedures may involve modeling either flow and using simulations to predict faults or gaps that might lead to invalid or incomplete verification or development of a product, service, or system (or portion thereof, or set thereof). A set of validation requirements, specifications, and regulations may then be used as a basis for qualifying a development flow or verification flow for a product, service, or system (or portion thereof, or set thereof). Additional validation procedures may also include those that are designed specifically to ensure that modifications made to an existing qualified development flow or verification flow will have the effect of producing a product, service, or system (or portion thereof, or set thereof) that meets the initial design requirements, specifications, and regulations; these validations help to keep the flow qualified. It is a process of establishing evidence that provides a high degree of assurance that a product, service, or system accomplishes its intended requirements. This often involves acceptance of fitness for purpose with end users and other product stakeholders. Written requirements for verification and/or validation may be created as well as formal procedures or protocols for determining compliance in accordance with this disclosure.

Verification that the ECU 200 design conforms in every possible permutation to the specification can be very difficult if not impossible and tax even the most advanced computing system. In general, in various exemplary embodiments, the present system validates from the traditional end of the specification to the beginning of the specification. For instance, the present system validates the entire ECU 200 control specification using a functional hierarchy validation of the graphically based executable logic. In an exemplary embodiment and with reference to FIG. 2, this hierarchy approach may move from the Module level 50 to the Feature level 75 to the Application level 100 to validate the entire ECU 200 control specification.

Module level 50 may comprise the lowest level within a feature 80. A module 55 may represent actual control logic, that is, the functional requirement of module 55 will generally comprise the logic itself. A combination of multiple modules 55 may result in a higher order functional requirement that may be evaluated. The combination of multiple modules 55 may result in feature 80. Validation performed on the Module level 50 may include low level control specification and low level functional requirements, for instance those related to structure. The Feature level 75 may comprise functions within an application 105. A feature 80 may be conceptualized as a function and/or subassy. For instance, the functional requirement associated with a feature 80 may be controlling the mode of the vehicle. The feature 80 controlling the mode of the vehicle may comprise many modules 55 that each determine and control elements within this function. Feature level 75 may comprise a functional hierarchy such as a module 55 and/or groups of modules 55. Since there is no dual use of modules 55 contemplated (overlap between functional hierarchies) an accumulative hierarchical approach may be performed with confidence of the results achieved. The Feature level 75 may comprise specific mid level functional requirements. The Feature level 75 may comprise a combination of actual control logic to perform a function. The Feature level 75 may comprise multiple layers of modules 55 based on complexity. The Application level 100 may comprise the entire specification. The Application level 100 may comprise functional hierarchies (such as a feature 80 and/or groups of features 80). The Application level 100 may comprise a combination of the features 80 to perform a general function.

In various embodiments, this system utilizes two validation categories: low-level validation and high-level validation. The low-level validation may comprise identification of structural and low-level functional issues (e.g. range violations, block design issues, dead code, etc.). This low-level validation may be configured to achieve module design functional correctness.

High-level validation may validate the feature 80 and the application 105 functional hierarchies to identify and correct control design issues (e.g. incorrect control theory, unintended design error, etc.). This high-level validation may be configured to achieve control design correctness.

In general, there are two validation stages and/or levels, the Feature level 75 and the Application level 100. The Feature level 75 may include structural and functional requirements. The Application level 100 may comprise functional requirements.

Figure 3A:
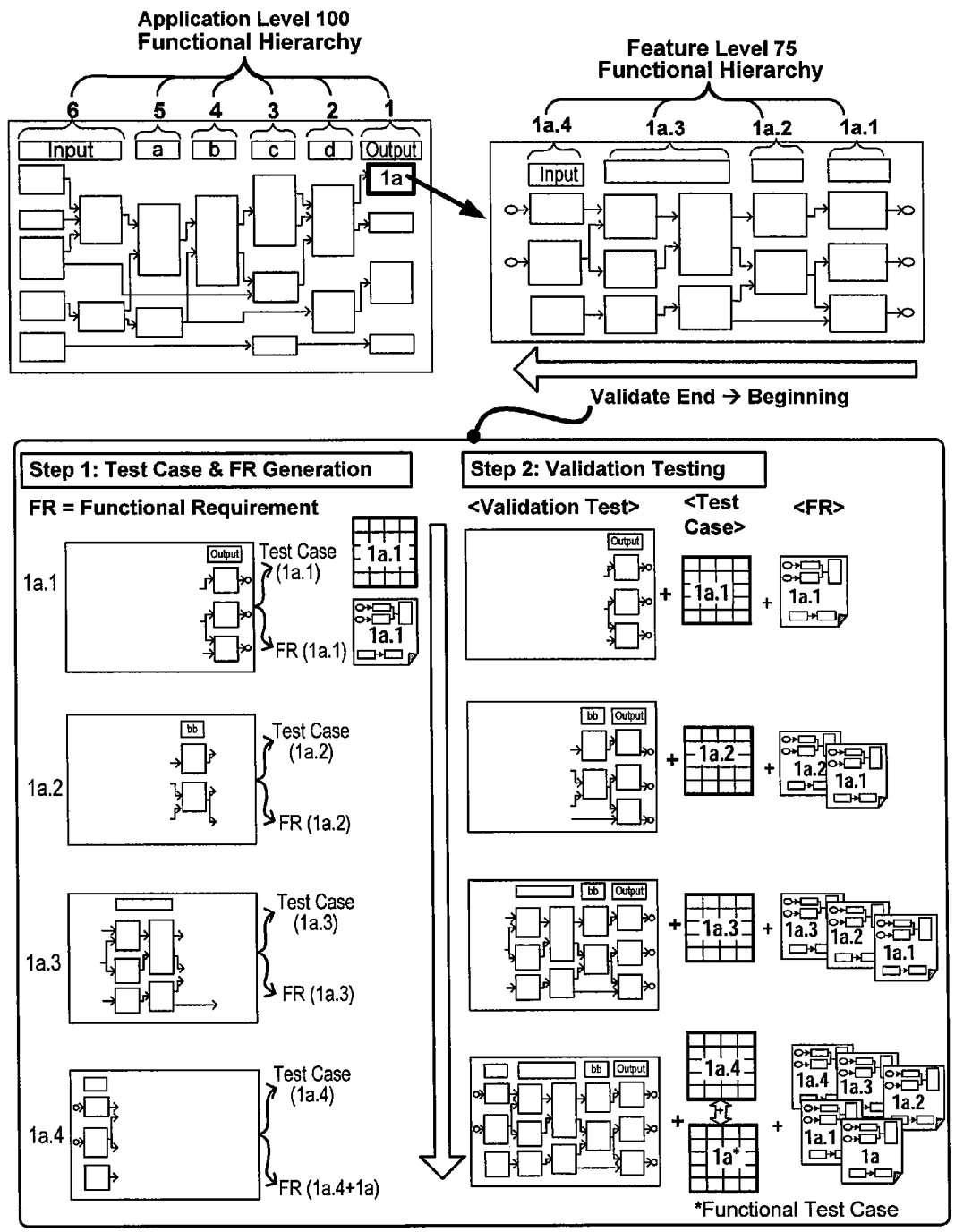
FIGS. 3A-3C depicts an exemplary process flow for validating one or more functional hierarchies.

With reference to FIG. 3A, an exemplary process flow is depicted. This process flow may be read left to right top to bottom, (following the provided arrows). Note, that the calculations depicted in the graphically based executable logic generally flow from left to right. However, the validation of established functional hierarchies is intended, in various exemplary embodiments, to be performed right to left.

Initially, these Application level 100 graphically based executable logic functional hierarchies are identified. Next, the features 80 comprised within the functional hierarchies are identified. An individualized test case to evaluate the structure of each feature 80 may be created (such as, test case 1a.1). Additionally, the functional requirement associated with each feature 80 (such as, functional requirement (FR) 1a.1) is identified. The associated test case (e.g., 1a.1) may include this testing of the functional requirement. Next, an individualized test case to evaluate the structure of the next feature 80 in the hierarchy may be identified (such as, test case 1a.2). Additionally, the functional requirement associated with each feature 80 (such as, functional requirement (FR) 1a.2) is identified. The associated test case (e.g., 1a.2) may include this testing of the functional requirement. This process is repeated until all of the test cases (1a) on the features 80 within the functional hierarchy at this level are generated.

In response to a test case being created (e.g., test case 1a.1), validation testing on that test case may be performed, such as running test case 1a.1. This validation testing may test that the structure is correct and that any associated functional requirement is met. In response to the feature 80 passing this validation testing, the validation test of the next feature 80 in the functional hierarchy is performed. This validation test may be inclusive with respect to the previously completed prior functional requirement validation performed within the functional hierarchy. This inclusive process reduces computational requirements. Also, individualized test cases specific to a discrete structure and/or functional requirement reduces overall computational requirements. Also, in various embodiments, once the module 55 or the feature 80 is validated, only higher level functional requirements need be performed.

Stated another way, in various embodiments, subsequent lower level validation at this level is not needed nor performed on the module 55 or the feature 80.

In response to all of the features 80 in the functional hierarchy being validated, a test case of the application 105 may be determined and run on the Application 100 level, similar to the test cases run on the Feature 75 level. At the Application 100 level, the test cases are generally not concerned with structure checking as that has been covered in the validation of the Feature level 75.

Various elements of the present system may be performed on a computer based simulator and/or contained within simulation software, such as Simulink™. Test cases at the Feature level 75 may be designed to achieve coverage targets, such as Simulink™ design verification (SLDV) level then progress using this hierarchical approach to a modified condition decision coverage (MCDC) level. Modified condition decision coverage may include substantially every path the logic may take and/or cover all functional requirements of the control specification. In various embodiments, modules are validated in response to MCDC targets being met and/or functional requirements not being violated. Violations of functional requirements result in addressing and/or correcting the module 55 errors.

Test cases at the Application level 100 may further be designed for specific functional checking (user, sensors such as a LA4 Lambda Meter, etc.). The Feature 75 and Application 100 levels may be validated when functional requirements are not violated. Functional requirement violations may result in addressing/fixing control design errors. A functional validation for the final feature 80 validation test (e.g., complete feature 80) and The Application level 100 validation may be performed in this stage.

With renewed reference to FIG. 3A, in various embodiments, the Feature level 75 may include low-level and high-level validation of the features 80 (e.g., structural and functional validation of features 80). For instance, MCDC for the feature 80 functional hierarchy and MCDC plus functional for a complete feature 80. Functional requirements may be added and/or evaluated as logic is evaluated. Each functional requirement may comprise multiple functional hierarchies. If a functional hierarchy does not include a functional requirement it may be included with another functional hierarchy for validation flow purposes.

Figure 3B:
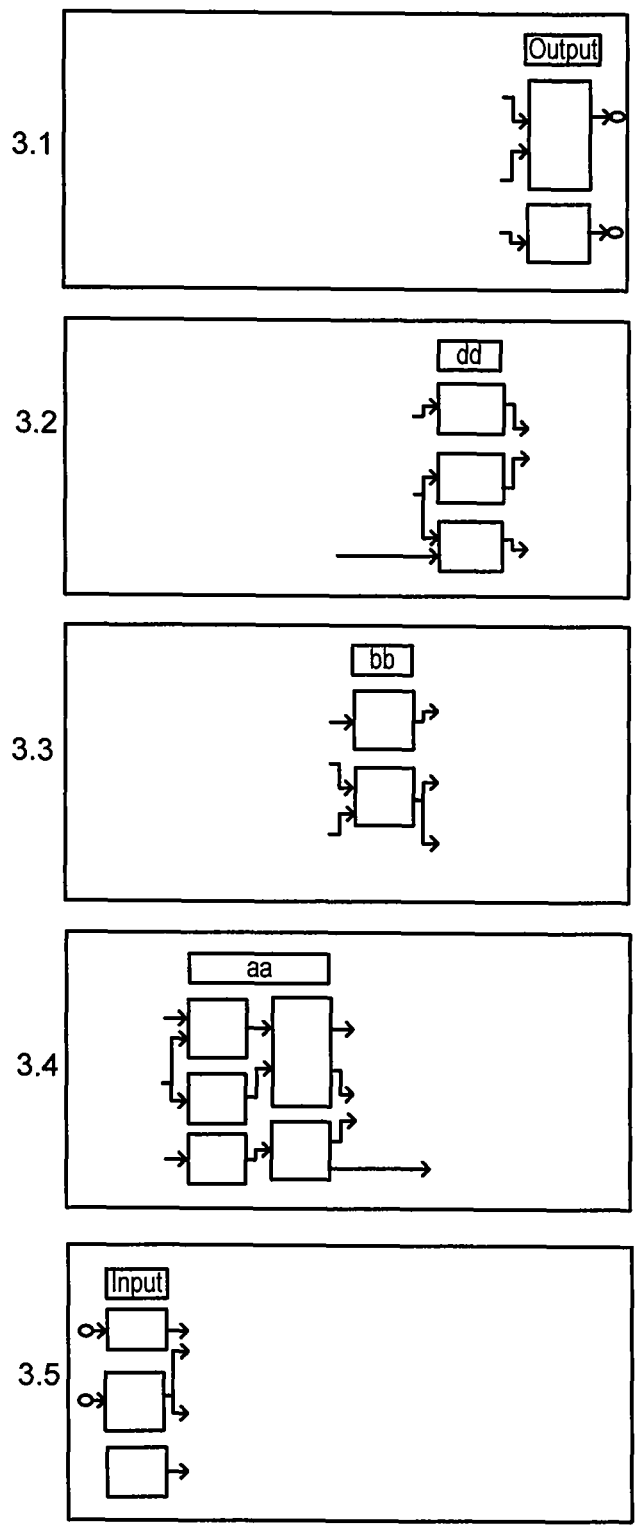
Figure 3C:
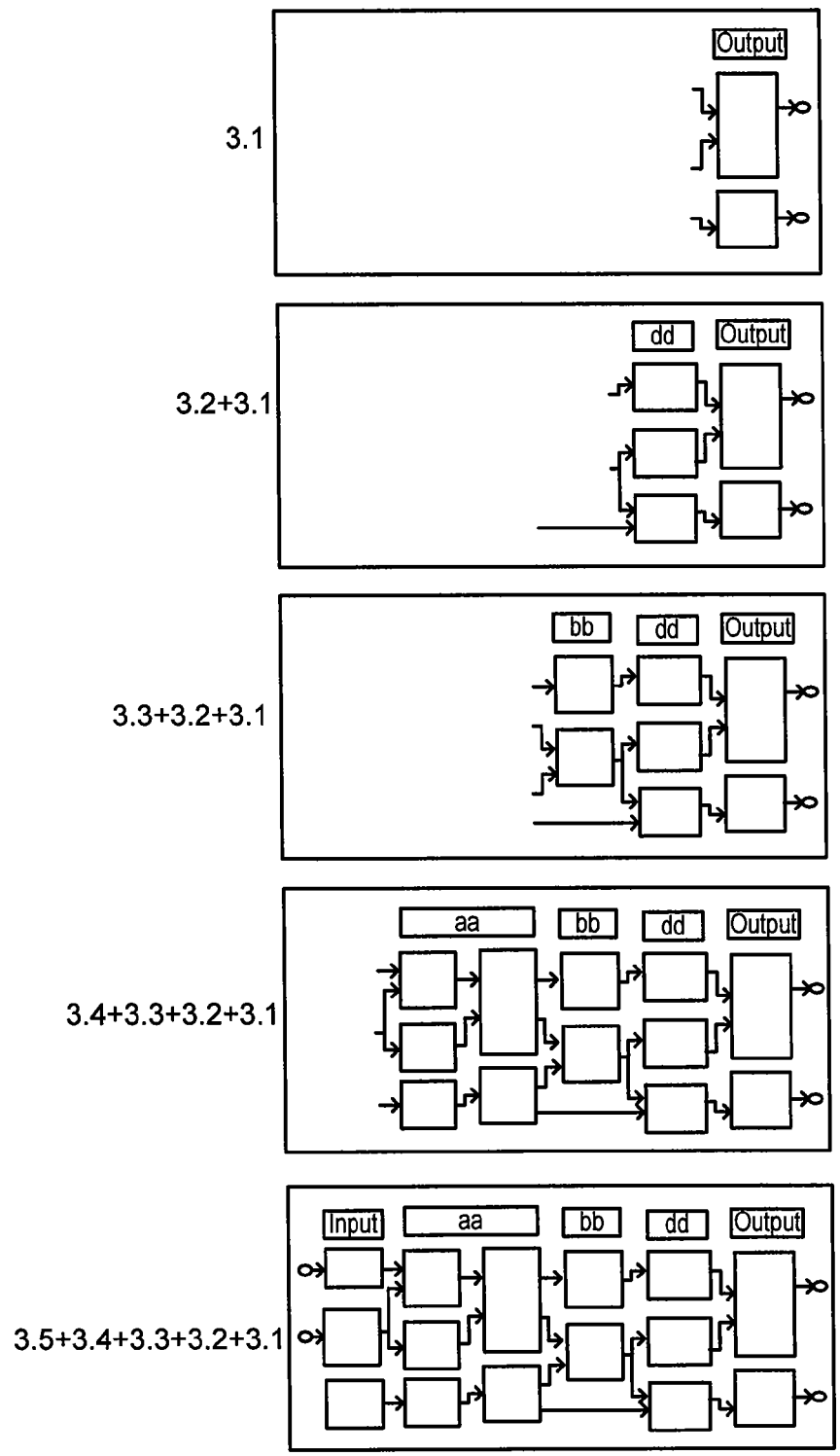

With reference to FIG. 3B, a graphical representation of test cases being run on the Application level 100 are depicted. For instance, test cases 3.1-3.5 each depict a unique identified functional hierarchy. A test case may be developed to test and/or validate the functional requirement associated with each functional hierarchy. With reference to FIG. 3C, test cases established in FIG. 3B are executed. For instance, test case 3.1 is performed. If test case 3.1 returns no errors, then test case 3.2 may be run. This is also an example of the process moving right to left, starting at the end of the specification. This test case (3.2) may optionally include the results of test case 3.1, (3.2+3.1). In this way, the body of knowledge is increased without overtaxing the computing system processing each test case.

Figure 4:
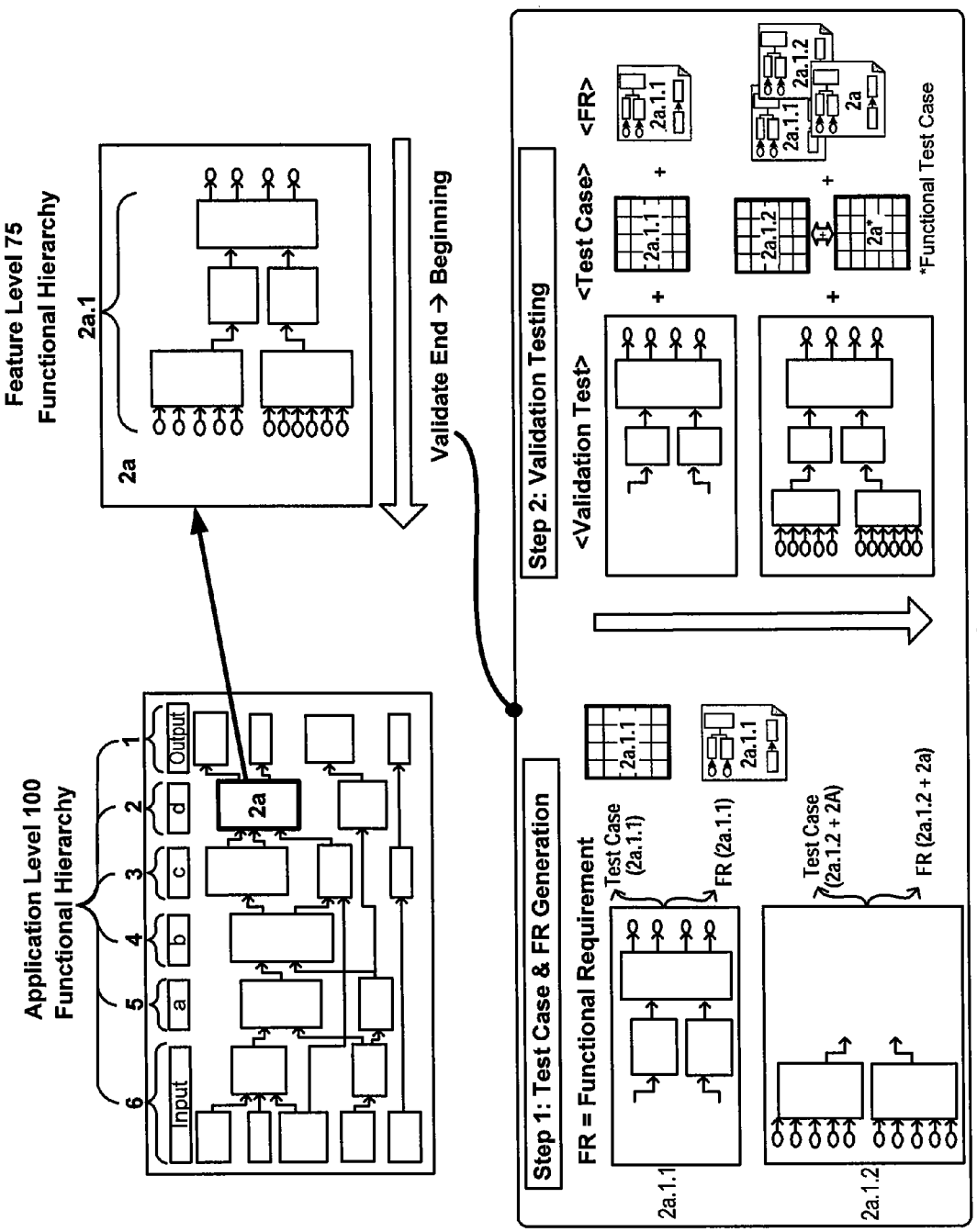
FIG. 4 depicts an exemplary process flow for validating one or more functional hierarchies.

With reference to FIG. 4, in various embodiments, the feature 80 functional hierarchy may not be defined in the control specification. Based on computational limitations, the user may select a functional hierarchy based on the functional requirements. For instance, in the scenario where a functional hierarchy comprises one module 55 (or a computationally, manageable number of modules 55) the validation may be accomplished in one test run. In the scenario where a functional hierarchy is too large and/or complex, the functional hierarchy should be subdivided into smaller units for validation.

Figure 5:
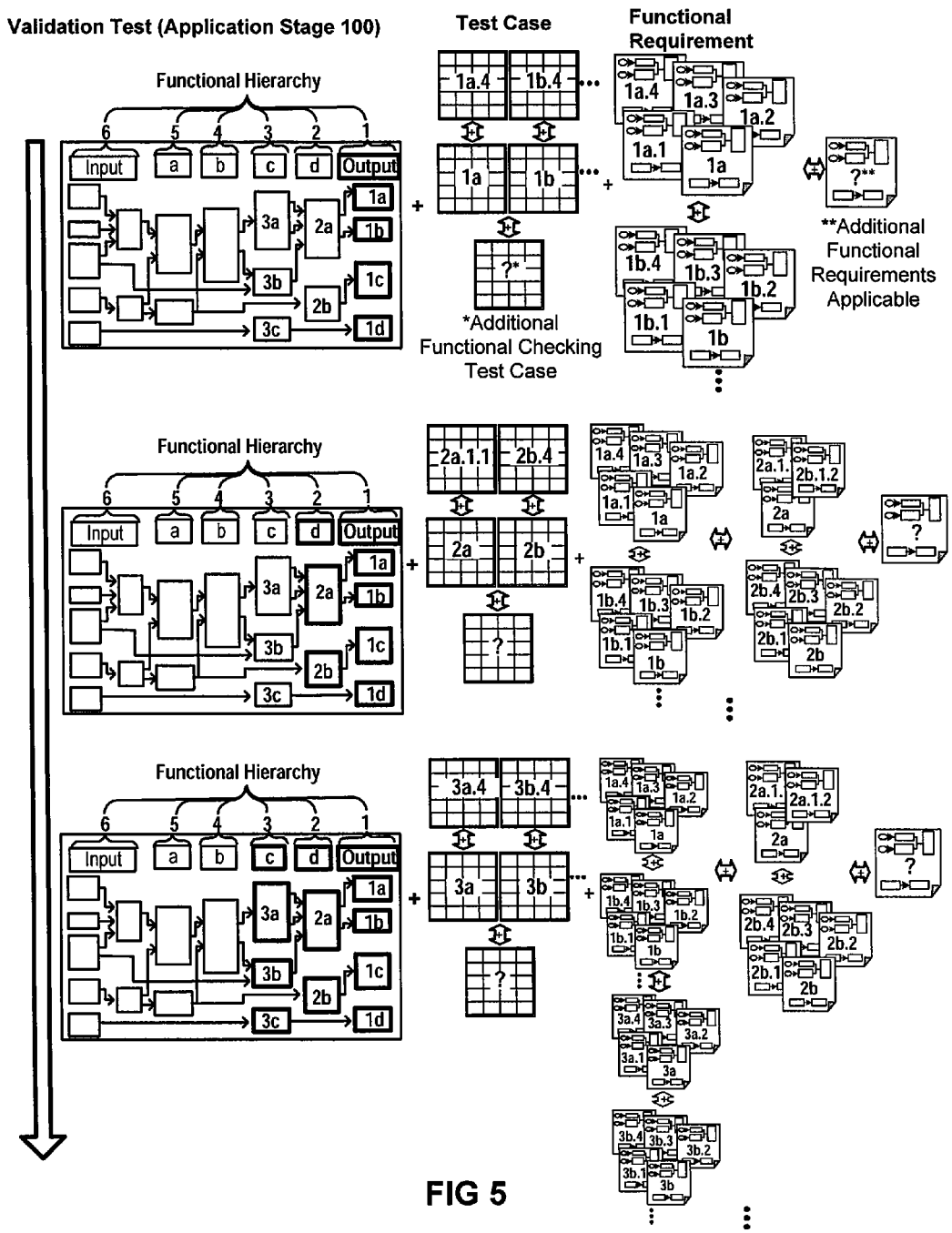
FIG. 5 depicts an exemplary process flow for running test cases configured for functional checking.

With reference to FIG. 5, in various embodiments, the Application level 100 comprises an Application level 100 functional hierarchy. The Application level 100 functional hierarchy may be validated on all functional hierarchies of the Feature level 75. The test cases for the Application level 100 should include new functional test cases and the feature 80 final functional hierarchy coverage test cases for improved and substantially exhaustive test coverage. Functional requirements may be added and/or evaluated as logic is validated. For instance, each functional requirement may utilize multiple functional hierarchies.

Figure 6:
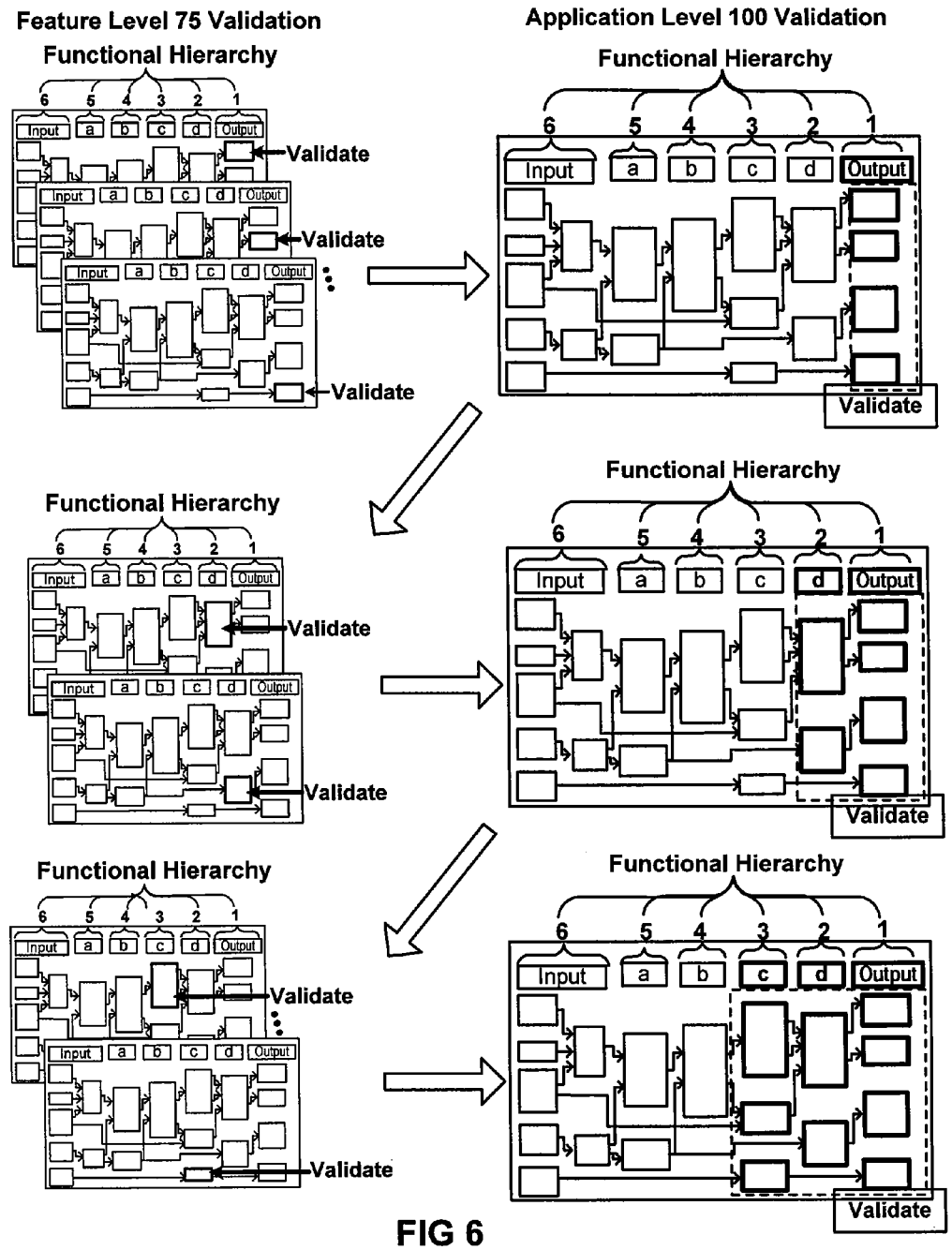
FIG. 6 depicts an exemplary process flow for aggregating validation information.

With reference to FIG. 6, in general, as previously stated, the validation system starts at the end and progresses to the Application level 100 functional hierarchy. For each feature 80 within a functional hierarchy, a Feature level 75 validation may be performed. In response to all features 80 within a functional hierarchy being validated, the Application level 100 validation for the functional hierarchy may be performed. This validation may build upon the accumulated validation of the Application level 100 functional hierarchy. In response to functional requirement violations being found within a functional hierarchy, low-level validation may be performed on the modules of interest and/or high-level validation should be re-done on the functional hierarchy. In some scenarios, the feature 80 validation may not follow the Application level 100 functional hierarchy order.

Figure 7:
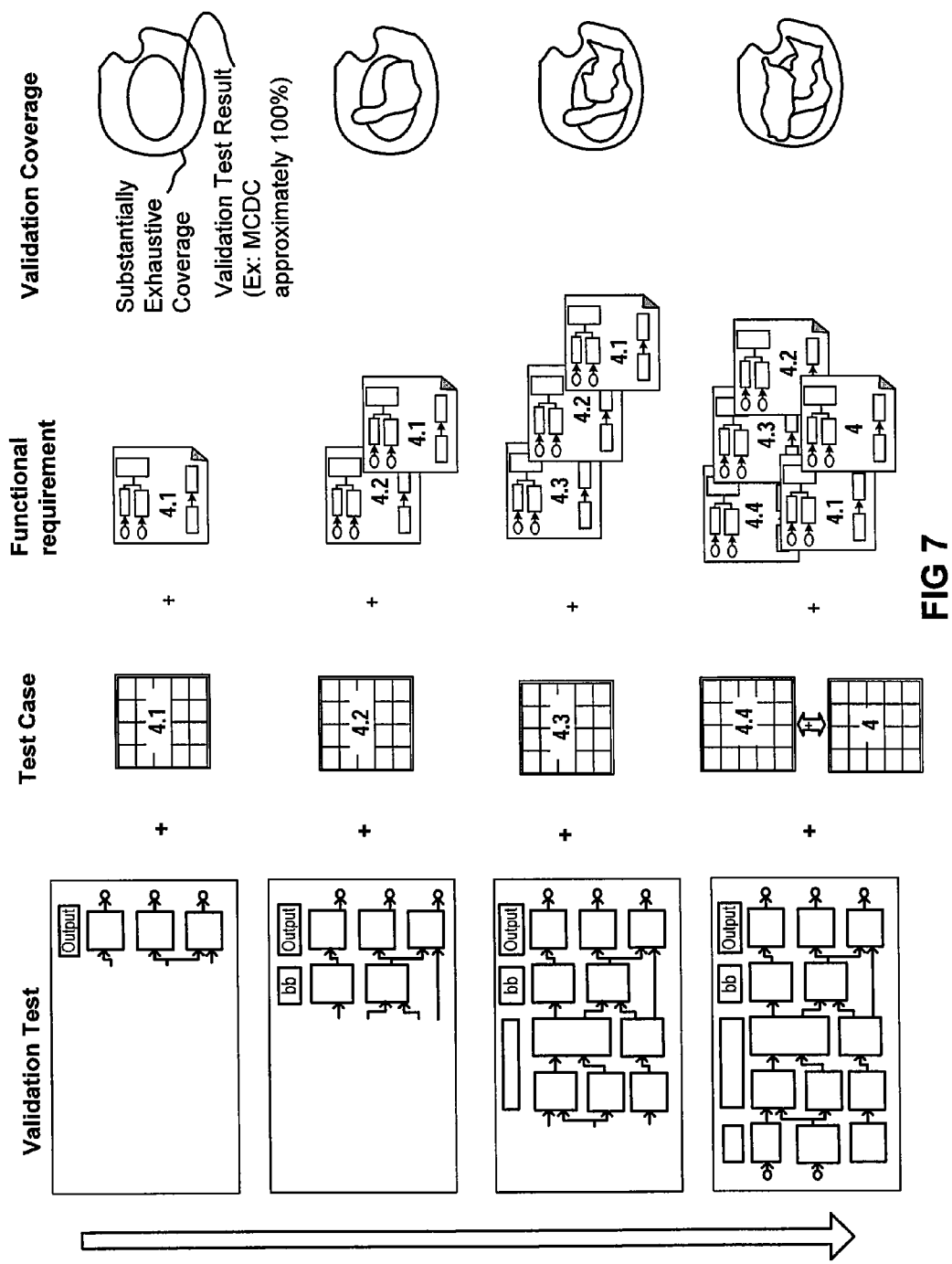
FIG. 7 depicts an exemplary process flow for improved confidence in coverage.

With reference to FIG. 7 in various exemplary embodiments, in response to substantially best possible coverage (MCDC) being achieved for a module 55, additional unique testing may result in improved exhaustive coverage. This additional testing may be performed to improve the confidence in the accuracy of the validation. This additional testing may be performed in the Feature level 75 and/or the Application level 100 to result in improved exhaustive coverage confidence.

A best possible coverage test case may be generated for each functional hierarchy separately. These test cases may be user defined or may be defined by formal methods. A test case may be generated for the level that has not yet been validated. Previously validated logic may be combined with currently targeted logic, thus validated logic may be accumulated and aggregated over time as more test cases are processed. Also, functional requirements may be added and validated as one progresses up hierarchy levels. Using best possible coverage test cases and test cases generated for specific functional checking, functional requirements may be validated. Stated another way, this system validates the feature level functional hierarchy first and then moves to the Application level 100 functional hierarchy validation utilizing the same concept. In various embodiments, the system is performed using graphic based logic.

Starting at the end of the specification and validating to the beginning allows a non-validated functional hierarchy to be validated utilizing best possible coverage techniques while maintaining validated functional hierarchies for higher level functional requirement checking. Generating test cases for each functional hierarchy separately reduces processing requirements and gives coverage results for a targeted functional hierarchy. This allows each functional hierarchy to be validated directly (lower level functional requirements) while including all eligible functional requirements (typically higher level functional requirements). This system provides the possibility to achieve a more comprehensive exhaustive testing when formal methods cannot be applied due to computational or mathematical limitations. In response to this process being completed on all of the Application level 100 functional hierarchies, the entire specification is validated to the best possible coverage and exhaustive metrics. This process and system may validate the application logic of the entire ECU 200, such as for ISO compliance. This ISO compliance can be to any suitable ISO specification. This ECU 200 may be used in a vehicle, such as a land vehicle, water craft or aircraft. The ECU 200 may be used in a car, an electric bicycle, motorcycle, scooter, four wheeler, atv, motorhome, train, ship, boat, aircraft, and/or spacecraft.

The graphically based executable logic may be converted to and from text logic at any desired time. For instance, in response to the entire ECU 200 being validated, the logic may be translated from graphically based executable logic to text based logic. Also, in response to the entire ECU 200 being validated, the logic may be passed on to software in the loop and/or hardware in the loop simulation for further verification/validation. Also, various aspects of this disclosure may be combined with rapid prototyping to further test the ECU 200 logic and/or the ECU 200 elements.

Steps described for one embodiment of a validation system may additionally or alternatively be incorporated into any of the other embodiments. For example, the steps described pertaining to FIG. 3A, may be used in any other embodiments. Those of ordinary skill would also appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method described in connection with the examples disclosed herein have been disclosed as pertaining to the ECU 200; however, this method is applicable to any graphically based executable logic and/or hierarchical validation of graphically based executable logic control specifications. For instance, with reference to FIGS. 8 and 9, .mdl files and functional hierarchies at the application level and feature level for any type of control specification are depicted.

Systems, methods and computer program products are provided. References to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Furthermore, the system may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method comprising the steps of:
    identifying, by a processor for hierarchically validating a graphically based logic control specification, a functional hierarchy of a first application of the control specification comprising a first feature that comprises a first module, the first module being at a lower layer or level than the first feature, and the first feature being at a lower layer or level than the first application;
    executing, by the processor, a first module test case on the first module to at least one of validate a structure of the first module or validate that a functional requirement of the first module is met;
    executing, by the processor, a first feature test case on the first feature after executing the first module test case to at least one of validate a structure of the first feature or validate that a functional requirement of the first feature is met; and
    executing, by the processor, a first application test case to the first application after executing the first feature test case to validate a functional requirement of the first application is met.

2. The computer-based method of claim 1, further comprising the steps of:
    executing, by the processor, a second feature test case to a second feature to at least one of validate a structure of the second feature or validate that a functional requirement of the second feature is met, wherein the functional hierarchy comprises the second feature, and wherein the validation of the second feature includes the validation of first feature results.

3. The computer-based method of claim 1, wherein the first feature comprises a plurality of modules, and the method further comprises executing, by the processor, a plurality of module test cases on the plurality of modules to at least one of validate a structure of each of the plurality of modules or validate that a functional requirement of each of the plurality of modules is met.

4. The computer-based method of claim 1, further comprising translating text based code into graphically based logic.

5. The computer-based method of claim 1, further comprising translating graphically based logic into text based code.

6. The computer-based method of claim 1, further comprising validating all of a plurality of applications in the control specification.

7. The computer-based method of claim 1, further comprising identifying, by the processor, a functional hierarchy of the first feature of the first application.

8. The computer-based method of claim 1, further comprising starting at the end of the control specification and validating to the beginning.

9. The computer-based method of claim 1, further comprising validating an entire electronic control unit.

10. The computer-based method of claim 9, wherein the electronic control unit is an electronic control unit of a vehicle.

11. The computer-based method of claim 1, wherein a unique feature test case is developed to validate each feature's unique functional requirement.

12. The computer-based method of claim 1, wherein the hierarchical validation process flows from module level to feature level to application level.

13. The computer-based method of claim 1, further comprising subdividing the feature functional hierarchy based on computational constraints.

14. The computer-based method of claim 1, wherein overlapping test case validation provide substantially exhaustive validation coverage.

15. The computer-based method of claim 1, wherein each feature comprises a function within the graphically based logic control specification.

16. The computer-based method of claim 1, wherein the computer-based method is used to validate the control specification to an International Organization for Standardization (ISO) specification.

17. The computer-based method of claim 1, wherein elements of the graphically based logic control specification are rendered on a user interface.

18. The computer-based method of claim 1, further comprising executing, by the processor, a second application test case on a second application to validate that a functional requirement of the second application is met.

19. A system comprising:
  a processor configured to hierarchically validate a graphically based logic control specification,
  a tangible, non-transitory memory configured to communicate with the processor,
  the tangible, non-transitory memory having instructions stored thereon that, in response to execution by the processor, cause the processor to perform operations comprising:
    identifying, by a processor for hierarchically validating a graphically based logic control specification, a functional hierarchy of a first application of the control specification comprising a first feature that comprises a first module, the first module being at a lower layer or level than the first feature, and the first feature being at a lower layer or level than the first application;
    executing, by the processor, a first module test case on the first module to at least one of validate a structure of the first module or validate that a functional requirement of the first module is met;
    executing, by the processor, a first feature test case on the first feature after executing the first module test case to at least one of validate a structure of the first feature or validate that a functional requirement of the first feature is met; and
    executing, by the processor, a first application test case to the first application after executing the first feature test case to validate a functional requirement of the first application is met.

20. An article of manufacture including a non-transitory, tangible computer readable storage medium having instructions stored thereon that, in response to execution by a computer-based system configured to hierarchically validate a graphically based logic control specification, cause the computer-based system to perform operations comprising:
    identifying, by the computer-based system, a functional hierarchy of a first application of the control specification comprising a first feature that comprises a first module, the first module being at a lower layer or level than the first feature, and the first feature being at a lower layer or level than the first application;
    executing, by the processor, a first module test case on the first module to at least one of validate a structure of the first module or validate that a functional requirement of the first module is met;
    executing, by the computer-based system, a first feature test case on the first feature after executing the first module test case to at least one of validate a structure of the first feature or validate that a functional requirement of the first feature is met; and
    executing, by the computer-based system, a first application test case to the first application after executing the first feature test case to validate a functional requirement of the first application is met.

* * * * *